United States Patent [19]

Santo

[11] Patent Number: 5,268,797
[45] Date of Patent: Dec. 7, 1993

[54] INTERCHANGEABLE EXTERNALLY MOUNTED REARVIEW MIRROR FOR A MOTOR VEHICLE

[75] Inventor: Antonio F. do E. Santo, Sao Paulo, Brazil

[73] Assignee: Metagal Industria E Comercio Ltda., Sao Paulo, Brazil

[21] Appl. No.: 911,984

[22] Filed: Jul. 10, 1992

[30] Foreign Application Priority Data

Jul. 10, 1991 [BR] Brazil .................. 7101535[U]

[51] Int. Cl.$^5$ ............................. G02B 7/18; B60R 1/06
[52] U.S. Cl. ..................................... 359/872; 359/841; 248/479; 248/481
[58] Field of Search ................ 359/872, 841; 248/479, 248/481, 475.1, 476, 477

[56] References Cited

U.S. PATENT DOCUMENTS

| | | | |
|---|---|---|---|
| 4,394,066 | 7/1983 | Sharp | 359/872 |
| 4,504,116 | 3/1985 | Sharp | 359/872 |
| 4,759,620 | 7/1988 | Sakuma et al. | 359/841 |
| 4,991,814 | 2/1991 | Schmidt et al. | 248/479 |

FOREIGN PATENT DOCUMENTS 2130990  11/1984  United Kingdom ................ 359/872

Primary Examiner—Bruce Y. Arnold
Assistant Examiner—R. D. Shafer
Attorney, Agent, or Firm—Michael J. Striker

[57] ABSTRACT

A rearview mirror apparatus for a motor vehicle, includes a mounting piece attachable to the motor vehicle; a prismatic body consisting of an intermediary part pivotally connectable to the mounting piece and a holder having an anterior opening; and a mirror element mounted in the anterior opening of the holder. The holder is symmetric relative to a longitudinal horizontal "X" axis thereof and has two bases projecting from one side thereof and the bases are positioned symmetrically on opposite sides of the "X" axis. The intermediary part has two corresponding projecting end pieces positioned to engage the two bases when the holder engages the intermediary part. The bases each have a mounting hole and one of the projecting end pieces has a threaded hole positioned so that, when the holder is engaged with the intermediary part, the holder can be secured to the intermediary part by a fixing screw engaged in the threaded hole and one of the holes of the bases. The other projecting piece has a protruding member positioned so as to engage in the other hole of the bases. Thus the rearview mirror apparatus can be moved from one side of the vehicle to the other and is interchangeable.

3 Claims, 2 Drawing Sheets

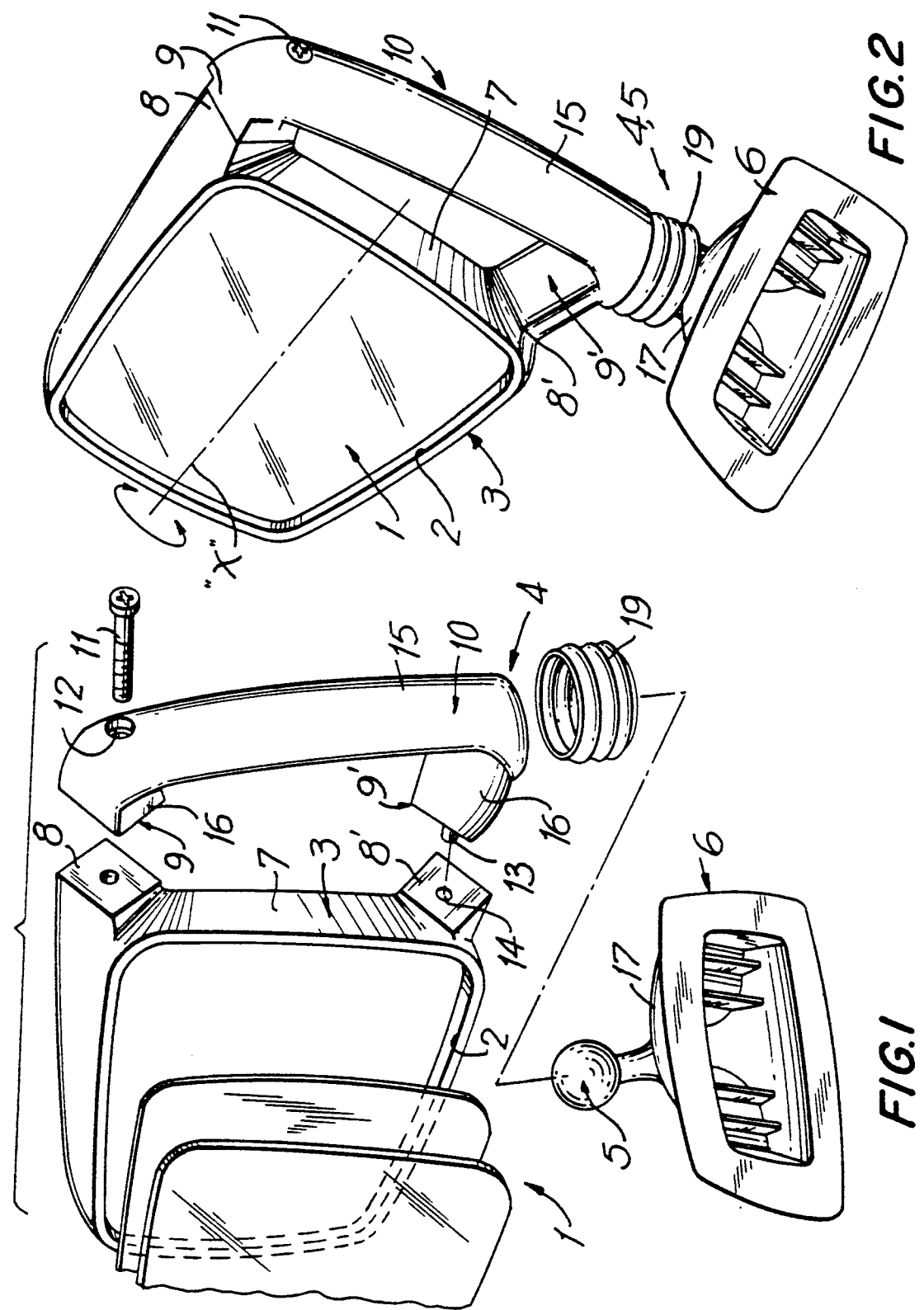

INTERCHANGEABLE EXTERNALLY MOUNTED REARVIEW MIRROR FOR A MOTOR VEHICLE

BACKGROUND OF THE INVENTION

The present invention relates to accessories for motor vehicles and, more particularly, to an externally mounted rearview or sideview mirror for a motor vehicle.

It is common to provide both right and left sides of an automobile with an external rearview mirror to provide the motorist with a better view of the rear area behind the motor vehicle.

Reversible rearview mirrors are known, but their structure is complex and there are other problems, although they can be used for the purpose for which they are designed.

SUMMARY OF THE INVENTION

It is an object of the present is to provide an interchangeable externally mounted rearview mirror apparatus of a simple and efficient structure.

According to the invention the rearview mirror apparatus for a motor vehicle, comprises a mounting piece attachable to the motor vehicle; a prismatic body including an intermediary part pivotally connectable to the mounting piece and a holder having an anterior opening and detachably secured to the intermediary part; pivot means for pivotally mounting the intermediary part on the mounting piece; and a mirror element mounted in the anterior opening of the holder. The holder for the mirror element is symmetric relative to a longitudinal horizontal "X" axis of the holder and has two bases projecting from one side of the holder for engagement with and mounting to the intermediary part. The bases are positioned symmetrically on opposite sides of the "X" axis, and the intermediary part has two corresponding projecting end pieces positioned to engage the two bases of the holder when the holder engages the intermediary part.

The bases each have a mounting hole and one of the projecting end pieces has a threaded hole positioned so that, when the holder is engaged with the intermediary part, the holder can be secured to the intermediary part by a fixing screw engaged in the threaded hole and one of the holes of the bases and the other projecting piece has a protruding member positioned so as to engage in the other hole of the bases. The bases of the holder and the projecting end pieces of the intermediary member are shaped and the mounting holes and the threaded hole are positioned so that the rearview mirror apparatus, when mounted on one side of the motor vehicle, can be removed and mounted on the other side of the vehicle by detaching the holder from the intermediary part by removing the fixing screw, removing the mounting piece and intermediary member and reattaching the mounting piece and intermediary member on the other side of the motor vehicle, rotating the holder 180° about the "X" axis, rotating the holder 180° about a vertical "Y" axis and reattaching the holder to the intermediary member with the fixing screw.

The structure for the mirror apparatus is particularly simple requiring only one fixing screw to secure the holder to the intermediary part, but yet it allows the holder on the mirror apparatus on one side of the vehicle to be interchanged with the holder on the other side of the vehicle by a simple operation. One and the same mirror apparatus can be conveniently mounted on either the right or the left side of the motor vehicle body.

In an advantageous embodiment of the invention the intermediary part is C-shaped and consists of a transverse branch and two arms. Each of the arms is short compared to the transverse branch and is provided with one of the end pieces engageable with one of the bases of the holder. The pivot means is located at a bottom corner of the intermediary part where a lower one of the arms and the transverse branch meet and the pivot means comprises a socket provided in the intermediary member and a spherical pivot member of the mounting piece shaped to pivotally engage in the socket of the intermediary member.

BRIEF DESCRIPTION OF THE DRAWING

The objects, features and advantages of the present invention will now be illustrated in more detail by the following detailed description, reference being made to the accompanying drawing in which:

FIG. 1 is an exploded perspective view of an interchangeable rearview mirror apparatus according to the invention;

FIG. 2 is perspective view of the assembled rearview mirror apparatus of FIG. 1;

DETAILED DESCRIPTION OF THE PREFERRED EMBODIMENT

Figure 3:
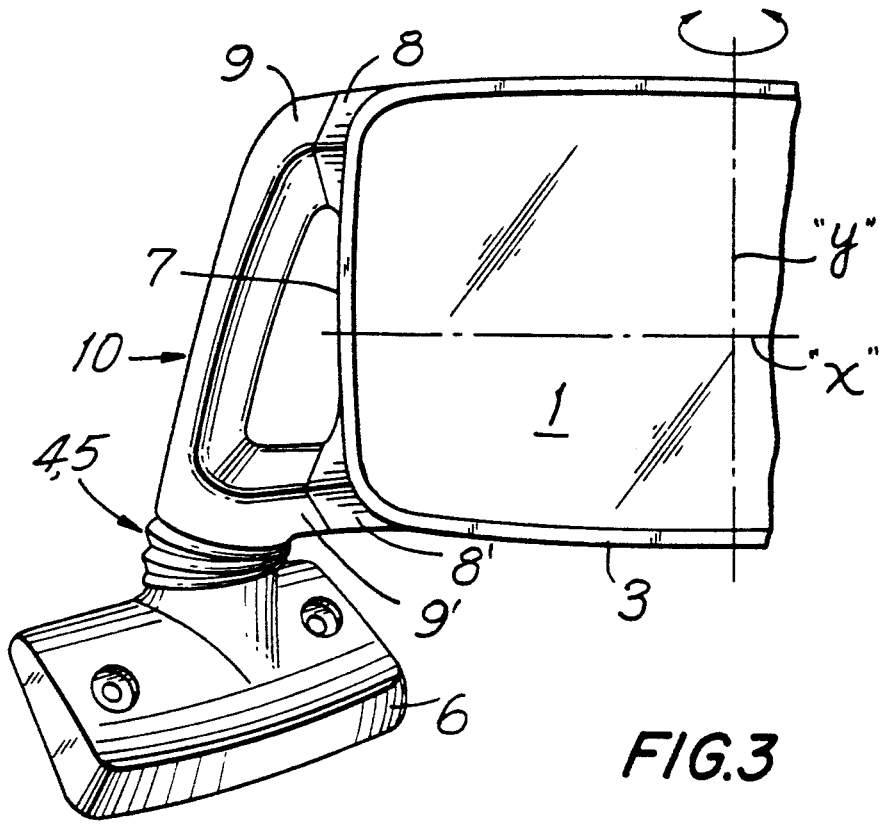
FIG. 3 is a cutaway front plan view of the interchangeable rearview mirror apparatus of FIG. 1 mounted on the right side of the vehicle body.

The rearview mirror apparatus shown in the drawing includes a mirror element 1 mounted in an anterior opening 2 of a holder 7 which is part of a prismatic body 3. The prismatic body 3 is pivotally mounted on a mounting piece 6 attachable to the vehicle body via an intermediary part 10. The intermediary part 10 of the prismatic body 3 can be provided with a pivot socket 4 and the mounting piece 6 can have a substantially spherical pivot member 5. The pivot member 5 is engageable in the pivot socket 4 for pivotally mounting the prismatic body 3 with the mirror element 1 on the mounting piece 6. The pivot socket 4 and the pivot member 5 together comprise a pivot means 4,5.

In the embodiment shown in FIGS. 1 and 2, the prismatic body 3 comprises the holder 7 for the mirror element 1 and the intermediary part 10. The holder 7 is symmetric in relation to a horizontal longitudinal axis "X? thereof. Two bases 8 and 8' are provided on a side of the holder 7 adjacent to and closest to the vehicle and are symmetrically disposed in relation to the "X" axis. The body 3 is mounted on the mounting piece 6 via the intermediary part 10 which has projecting end pieces 9 and 9' positioned and shaped, so that the bases 8 and 8' of the holder 7 can engage and fit them. In the embodiment shown in the drawing FIGS. 1 and 2 the bases 8 and 8' are on the right side of the holder 7. One of the projecting end pieces 9 or 9' has a threaded hole 12 for a fixing screw 11 by which the holder 7 is secured to the intermediary part 10. The threaded tip of the fixing screw 11 engages in one of the holes 14 in the corresponding base 8 or 8' of the holder. The other projecting end piece 9' or 9 not having the threaded hole 12 for the screw 11 has a protruding member 13 which engages in a hole or socket 14 of the other base 8' or 8.

Thus only a single fixing screw 11 is necessary to attach the holder 7 to the intermediary part 10.

In the preferred embodiment shown in the drawing the intermediary part 10 of the body 3 is formed by a wide open C-shaped piece including a transverse branch 15 and two comparatively short arms 16 extending perpendicularly from the transverse branch 15. Each arm 16 is provided with one of the end pieces 9 or 9', which engages base 8 or 8' when the holder is mounted on the intermediary part. The pivot means 4,5 is formed at the bottom corner of the intermediary part 10 where the lower arm 16 meets the transverse branch 15. The pivot means 4,5 comprises the socket 4 and the spherical pivot member 5 engaged in the socket on the intermediary part 10.

Figure 4:
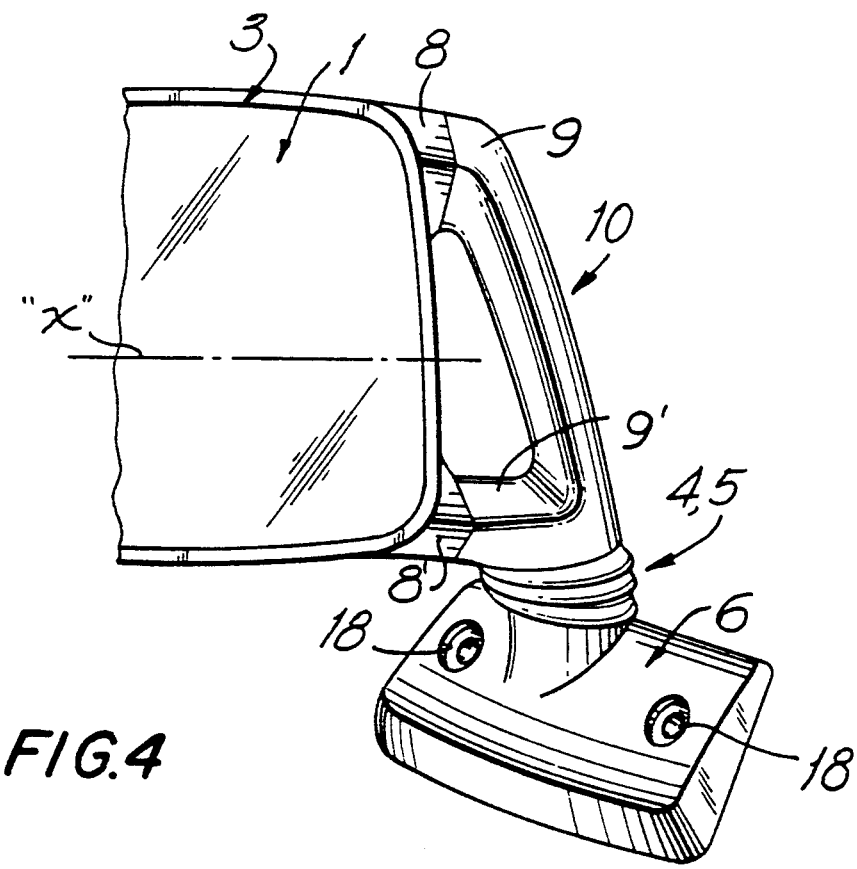
FIG. 4 is a cutaway front plan view of the rearview mirror apparatus of FIG. 1 mounted on the left side of the vehicle body.

In FIG. 3 the rearview mirror apparatus is shown mounted on the right side of the vehicle. In this case the intermediary part 10 and the mounting piece 6 are on the left side of the holder 7. On the other hand, when the external rear view mirror apparatus is assembled for use on the left side of the vehicle, as shown in FIG. 4, the above-mentioned intermediary part 10 and the mounting piece 6 are on the right side of the prismatic body 3.

Thus the same mirror apparatus can be used on either the right or left side of the vehicle and is thus interchangeable. When moving a mounted rearview mirror apparatus from the right side of the vehicle to the left side, the holder 7 is removed from the intermediary part 10 and is rotated 180° about the "X" axis, the intermediary part 10 and the mounting piece 6 are moved from the right to the left side of the vehicle and reattached, then the holder 7 is rotated 180° about its "Y" axis and reattached to the intermediary part 10 as shown in FIG. 3.

The mounting piece 6 is provided with holes 18 for screws which attach the mounting piece to the chassis of the vehicle and the pivot means 4,5 has a protecting sleeve 19 which covers the spherical pivot member 5 in operation.

The rearview mirror apparatus with such reversing features can be constructed in different sizes, shapes and can be of different colors and can be made of different materials which are designed to fit the particular application.

While the invention has been illustrated and embodied in an interchangeable externally mounted rearview mirror apparatus for a motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A rearview mirror apparatus for a motor vehicle, comprising a mounting piece attachable to the motor vehicle;

a prismatic body comprising an intermediary part pivotally connectable to the mounting piece and a holder having an anterior opening and being detachably secured to the intermediary part;

pivot means for pivotally mounting the intermediary part on the mounting piece; and a mirror element mounted in the anterior opening of the holder;

wherein the holder for the mirror element has a longitudinal horizontal "X" axis and a vertical "Y" axis perpendicular to the "X" axis and the holder is symmetric relative to the longitudinal horizontal "X" axis and has two bases projecting from one side of the holder for engagement with and mounting to the intermediary part and the bases are positioned symmetrically on opposite sides of the "X" axis, and the intermediary part has two corresponding projecting end pieces positioned to engage the two bases of the holder such that, the holder engages the intermediary part, and wherein the bases each have a mounting hole and one of the projecting end pieces has a threaded hole positioned such that, the holder is engaged with the intermediary part, the holder can be secured to the intermediary part by a fixing screw engaged in the threaded hole and one of the holes of the bases and the other projecting piece has a protruding member positioned so as to engage in the other hole of the bases, and wherein the bases of the holder and the projecting end pieces of the intermediary member are shaped and the mounting holes and the threaded hole are positioned so that the rearview mirror apparatus, when mounted on one side of the motor vehicle, can be removed and mounted on the other side of the vehicle by detaching the holder from the intermediary part by removing the fixing screw, removing the mounting piece and intermediary member and reattaching the mounting piece and intermediary member on the other side of the motor vehicle, rotating the holder 180° about the "X" axis, rotating the holder 180° about the "Y" axis and reattaching the holder to the intermediary member with the fixing screw.

2. A rearview mirror apparatus as defined in claim 1, wherein the intermediary part is C-shaped and has a transverse branch and two arms, each of the arms being short compared to the transverse branch and being provided with one of the end pieces engageable with one of the bases of the holder.

3. A rearview mirror apparatus as defined in claim 2, wherein the pivot means is located at one corner of the intermediary part, a lower one of the arms and the transverse branch meeting in the vicinity of the one corner, and the pivot means comprises a socket provided in the intermediary member and a spherical pivot member of the mounting piece shaped to pivotally engage in the socket of the intermediary member.

* * * * *